US007274179B2

(12) United States Patent
Matsuda

(10) Patent No.: US 7,274,179 B2
(45) Date of Patent: Sep. 25, 2007

(54) INRUSH CURRENT PREVENTING CIRCUIT

(75) Inventor: Shoji Matsuda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/474,680

(22) Filed: Jun. 26, 2006

(65) Prior Publication Data

US 2006/0290335 A1 Dec. 28, 2006

(30) Foreign Application Priority Data

Jun. 27, 2005 (JP) ............................. 2005-186625

(51) Int. Cl.
*H02M 1/40* (2006.01)

(52) U.S. Cl. ...................................... 323/282; 323/908

(58) Field of Classification Search ................ 323/273, 323/275, 276, 277, 282, 908; 361/58
See application file for complete search history.

(56) References Cited

U.S. PATENT DOCUMENTS 5,041,777 A * 8/1991 Riedger ...................... 323/277
5,283,707 A * 2/1994 Conners et al. ............... 361/58
5,909,364 A * 6/1999 Rivet et al. .................... 363/89
6,438,002 B2 * 8/2002 Alhoussami ................. 363/50
6,542,344 B1 * 4/2003 Mashiko .................... 361/93.9
6,657,408 B2 * 12/2003 Goto et al. ................. 318/442
6,831,447 B1 * 12/2004 Wittenberg ................ 323/222

FOREIGN PATENT DOCUMENTS

JP 11-353038 12/1999
JP 2004-129419 4/2004

* cited by examiner

*Primary Examiner*—Adolf Berhane
(74) *Attorney, Agent, or Firm*—Brinks Hofer Gilson & Lione

(57) ABSTRACT

There is provided an inrush current preventing circuit. The circuit comprises an voltage-controlled type switching device that has an input terminal, an output terminal and a control terminal that limits current between the input terminal and the output terminal by an applied voltage. A first resistor is connected in parallel between the input terminal and the control terminal. A voltage control means is connected in series to the control terminal and varies a voltage applied to the control terminal.

3 Claims, 6 Drawing Sheets

INRUSH CURRENT PREVENTING CIRCUIT

This application claims the benefit of the Japanese Patent Application No. 2005-186625 filed on Jun. 27, 2005, which is hereby incorporated by reference.

BACKGROUND

1. Field

An inrush current preventing circuit is provided.

2. Related Art

Generally, a switching power source apparatus comprises an inrush current preventing circuit to prevent large current (inrush current) generated instantaneously at the time of starting of an electronic equipment connected to the switching power source apparatus from flowing directly to the electronic equipment. In this configuration, an electronic equipment connected to the switching power source apparatus can avoid dangerousness that affects an electric system of the electronic equipment by unnecessarily operating a fuse or a circuit breaker of the electronic equipment.

As shown in FIG. 4, a conventional switching power source apparatus, as an example, is formed by a direct-current power source 110 that supplies direct current. An inrush current preventing circuit 101 prevents an inflow of inrush current. A DC-DC converter circuit 113 converts a voltage of the direct-current power source 110, so as to be connected in series to one another (referring to Patent Document 1).

An inrush current preventing circuit 101 has a switching device 102 that operates a switch by an applied voltage of MOS (Metal-Oxide-Semiconductor) type FET (Field Effect Transistor) or the like. The switching device 102 has an input terminal 102*a* that inputs current from a direct-current power source 110. An output terminal 102*b* outputs the inputted current to a DC-DC converter circuit 113. A control terminal 102*c* applies a voltage, which controls current between the input terminal 102*a* and the output terminal 102*b*.

In the inrush current preventing circuit 101, a condenser 104 is connected in parallel between the input terminal 102*a* and the control terminal 102*c* of the switching device 102 and also a second resistor 103 is connected in parallel therebetween through a first resistor 105. The inrush current preventing circuit 101 has a discharge switching device 108 connected to a ground downstream of the first resistor disposed to the control terminal 102*c*. A voltage-controlled type switching device such as MOS type FET, similarly to the switching device 102, is used as the discharge switching device 108, and a discharge switch control means 109, which applies a voltage to the discharge switching device 108 in accordance with a predetermined setting, is connected to a control terminal 108*c* of the discharge switching device 108.

As described above, in a conventional inrush current preventing circuit 101 of a switching power source apparatus 100, since a condenser 104 is connected in parallel to a switching device 102, the inrush current preventing circuit 101 starts a direct-current power source 110 and can charge the condenser 104 connected in parallel to the switching device 102 when the discharge switching device 108 becomes a conduction state by an applied voltage from a discharge switch control means 109.

As shown in FIG. 5, when the condenser 104 charges, the voltage V (hereinafter, referred to as "a voltage of a switching device"), which is applied between the input terminal 102*a* and the control terminal 102*c*, gradually increases from an initial voltage V0 to a predetermined voltage V1. The increase of the voltage V depends on a time constant t obtained by the product of a resistance R of the first resistor 105 and a capacitance C of the condenser 104. Therefore, although a step-shaped voltage Vi is applied from a direct-current power source 110, the voltage V of the switching device 102 does not increase to the predetermined voltage V1 from the time t0 when a switching power source apparatus 100 starts until the predetermined time passed by a delay time td passes t1. Further, when the voltage V of the switching device 102 becomes the predetermined voltage V1 (when the predetermined time passes t1), the switching device 102 becomes a desired conduction state.

As shown in FIG. 5, since the conventional inrush current preventing circuit 101 of the switching power source apparatus 100 becomes a non-conduction state from the time t0 when the switching power source apparatus 100 starts until the predetermined time passed by a delay time td passes t1, the inrush current preventing circuit 101 prevents a inrush current, which is easily generated when the direct-current power source 110 starts, from inflowing to a load-resistor 112.

As shown in FIG. 4, in the conventional inrush current preventing circuit 101 of the switching power source apparatus 100, since a ground 107 is connected to an end of the discharge switching device 108, the inrush current preventing circuit 101 can completely discharge the condenser 104 from the time t2 when the direct-current power source 110 stops until the delay time td passes and completely discharged t3. In this configuration, although the direct-current power source 110 restarts after the discharged time t3, inrush current can be prevented.

The conventional inrush current preventing circuit 101 of the switching power source apparatus 100 above described needs a predetermined time (a delay time) td for discharging a condenser 104 completely. Therefore, there has been a problem that, when a direct-current power source 110 restarts immediately after the stop thereof, a voltage, which is larger than that V0 at the time of complete discharge of the condenser 104, is applied to a switching device 102.

As shown in FIG. 6, since a condenser is not discharged completely, a voltage V3 when the direct-current power source 110 restarts t4, from the time t2 when the direct-current power source 110 stops until the delay time td passes, becomes a value between a voltage V0 at the time of complete discharge t0 and a voltage V1 at the time of complete charge t2. The voltage V3 at the time of restart t4, as comes near the stop of the direct-current power source 110, becomes a value that is approximate to a voltage V1 at the time of complete charge t2. Therefore, when a direct current supplied from the direct-current power source 110 is a clock signal with a high duty ratio, a voltage V3 of the switching device 102 at the time of restart t4 increases.

A voltage-controlled type switching device 102 is configured to flow current that corresponds to an applied voltage without flowing current after a predetermined voltage V1 is applied. Therefore, when the voltage V3 is applied to the switching device 102 at the time of restart t4 of the direct-current power source 110, the direct-current power source 110 can not avoid current passing. As the voltage V3 is applied to the switching device 102 at the time of restart t4 of the direct-current power source 110 becomes a high value, a voltage passing the switching device 102 becomes inrush current which can affect a load-resistor 112 and then flows to the load-resistor 112.

In other words, in the conventional inrush current preventing circuit 101, since inrush current that corresponds to the voltage V3 at the time of restart t4 of the direct-current power source 110 flows to the switching device 102, the inrush current which passed the switching device 102 affects the load-resistor 112.

SUMMARY

An inrush current preventing circuit comprises a voltage-controlled type switching device having an input terminal. An output terminal and a control terminal controls current between the input terminal and the output terminal by an applied voltage. A first resistor is connected in parallel between the input terminal and the control terminal. A voltage control means is connected in series to the control terminal and controls a voltage applied to the control terminal.

Without depending on a discharge time of a condenser necessary for a conventional inrush current preventing circuit, a desired voltage preventing inrush current from flowing can be applied to a switching device.

According to a second embodiment, in the inrush current preventing circuit according to the first embodiment the voltage control means comprises a second resistor that is connected in series to the control terminal. A third resistor is connected in series between the second resistor and a ground. A discharge switching device is connected in parallel to the third resistor. A discharge switch control means transmits a control signal for performing a switch operation of the discharge switching device to the discharge switching device.

In this configuration, the voltage control means is formed in a simple construction, and a voltage applied to the switching device can be selectively determined and controlled.

According to a third embodiment, in the inrush current preventing circuit according to a first embodiment, the discharge switch control means is configured to transmit a control signal that allows the discharge switching device to be a conduction state after a lapse of predetermined times determined by a desired setting.

The discharge switch control means can limit current of the switching device during only a predetermined time thinking that inrush current will be generated.

According to a fourth embodiment, in the inrush current preventing circuit according to a first embodiment, the discharge switch control means is configured to transmit a control signal allowing the discharge switching device to be a conduction state based on a predetermined signal transmitted from a control means that controls an electronic equipment connected to the output terminal.

The discharge switch control means can control a discharge switching device based on information related to inrush current such as a value of current flowing to an electronic equipment.

Since the inrush current preventing circuit is formed as described above, it can surely prevent passage of an inrush current that affects an electronic equipment although a direct-current power source connected to the inrush current preventing circuit starts immediately.

Since the inrush current preventing circuit is formed in a simple construction as a whole, it can achieve save-spacing and improvement of cost performance.

DRAWINGS

FIG. 3 is a graph that illustrates each voltage applied to an inrush current preventing circuit.

FIG. 5 is a graph that illustrates each voltage applied to an inrush current preventing circuit according to a prior art.

FIG. 6 is a graph that illustrates an applied voltage when immediately restarted to an inrush current preventing circuit according to a prior art.

DESCRIPTION

Hereinafter, an inrush current preventing circuit will be explained with reference to FIG. 1 and FIG. 2.

Figure 1:
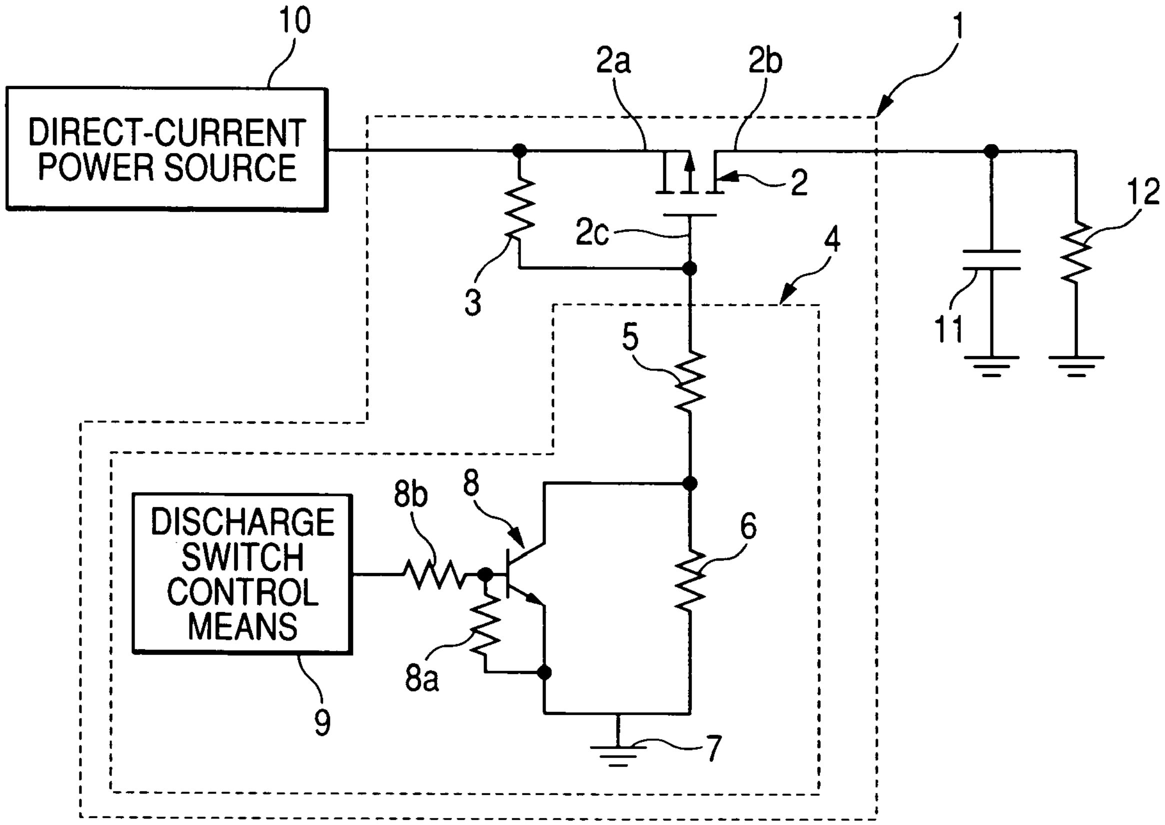
FIG. 1 is a circuit diagram that illustrates an inrush current preventing circuit.

FIG. 1 shows a circuit diagram of an inrush current preventing circuit. FIG. 2 shows a circuit diagram of an inrush current preventing circuit comprising a feedback signal line.

As shown in FIG. 1, an inrush current preventing circuit comprises a voltage-controlled type switching device 2 that has an input terminal 2*a*, an output terminal 2*b* and a control terminal 2*c*. A first resistor 3 is connected in parallel between the input terminal 2*a* and the control terminal 2*c*. A voltage control means 4 is connected in series to the control terminal 2*c*.

The switching device 2 is configured to flow current from the input terminal 2*a* connected to a direct-current power source 10 to a load-resistor 12 disposed to an electronic equipment and the output terminal 2*b* connected to an internal condenser 11. The switching device 2 is configured to control current that flows from the input terminal 2*a* to the output terminal 2*b* by an applied voltage between the input terminal 2*a* and the control terminal 2*c*. MOS (Metal-Oxide-Semiconductor) type FET (Field Effect Transistor) of P channel type is used as the switching device 2. For example, the input terminal 2*a* of the switching device 2 serves as a FET source, the output terminal 2*b* serves as a drain, and the control terminal 2*c* serves as a gate. An applied voltage V (hereinafter, referred to as "a voltage of a switching device") between the input terminal 2*a* and the control terminal 2*c* corresponds to a gate voltage of FET.

As a voltage control means 4 controls a voltage V of the switching device 2, a circuit comprises a second resistor 5 that is connected in series to the control terminal 2*c*. A third resistor 6 is connected in series between the second resistor 5 and a ground 7. A discharge switching device 8 is connected in parallel to the third resistor 6. A discharge switch control means 9 transmits a control signal that performs a switch operation of the discharge switching device 8 to the discharge switching device 8 is used.

As a discharge switching device, NPN type transistor is used. For example, a collector is connected to the second resistor 5, an emitter is connected to the ground 7, and a base is connected to the discharge switch control means 9.

Resistors 8*a*, 8*b* that divide a control signal are connected to the discharge switching device 8.

The discharge switch control means 9 is configured to transmit a control signal from the time when the direct-current power source 10 starts (including restart) after a lapse of predetermined times determined by a desired setting. For example, generally, it may be configured to transmit a control signal from the discharge switch control means 9 to the discharge switching device 8 after about 0.1 sec by using the fact that the control signal is generated after about 1 sec from the time when the direct-current power source 10 starts (including restart).

Figure 2:
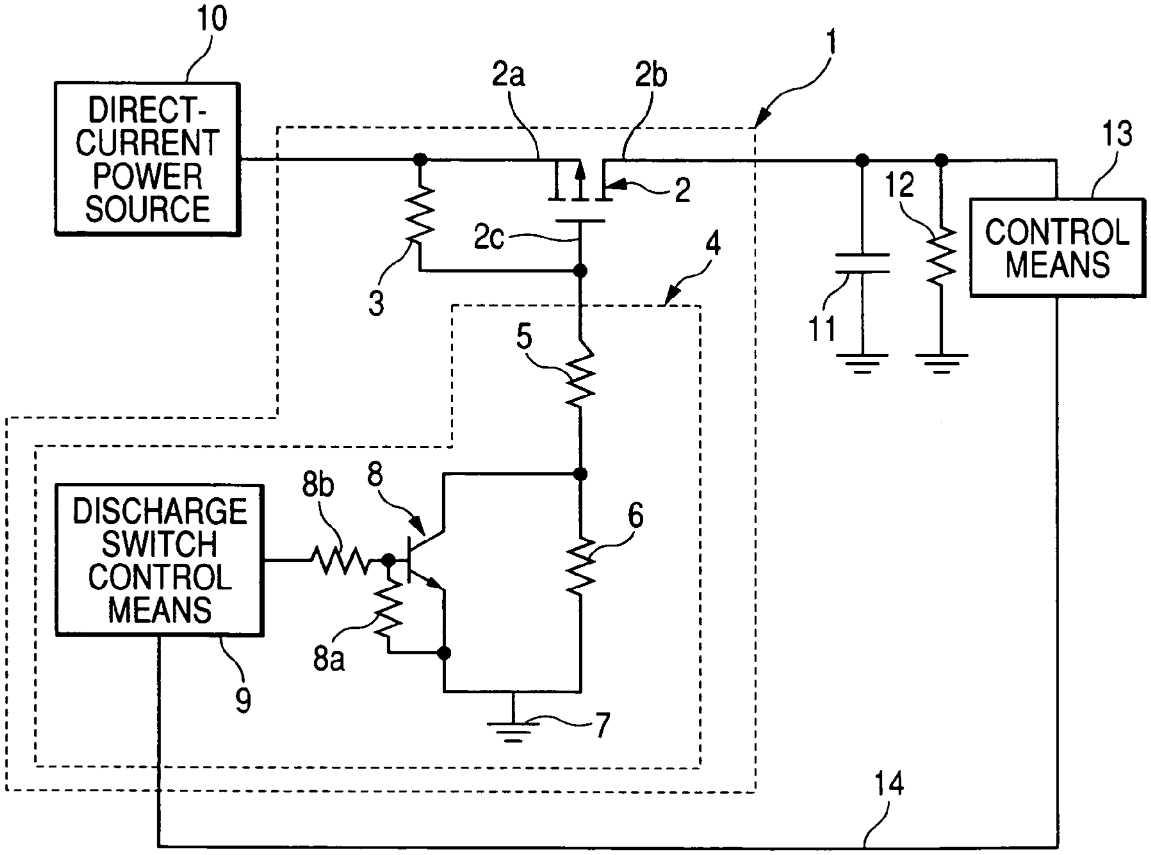
FIG. 2 is a circuit diagram that illustrates an inrush current preventing circuit that comprises a feedback signal line.

As shown in FIG. 2, the discharge switch control means 9 may be configured to transmit a control signal based on a predetermined signal transmitted from a control means 13 that controls an electronic equipment such as CPU (central processing unit). For example, it may be configured to transmit a feedback signal in response to current measured by the control means 13 by providing a feedback signal line between the control means 13 and the discharge switch control means 9, and then to transmit a control signal allowing the discharge switching device 8 to be a conduction state based on the feedback signal.

The operation of an inrush current preventing circuit 1 will be explained with reference to FIG. 3 and FIG. 4.

Figure 3A:
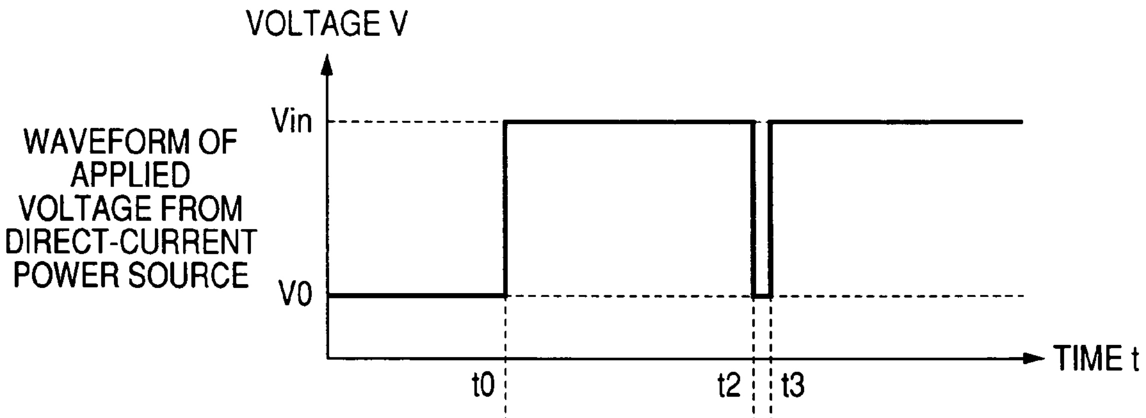
FIG. 3A shows a waveform of applied voltage from direct-current power source.
Figure 3B:
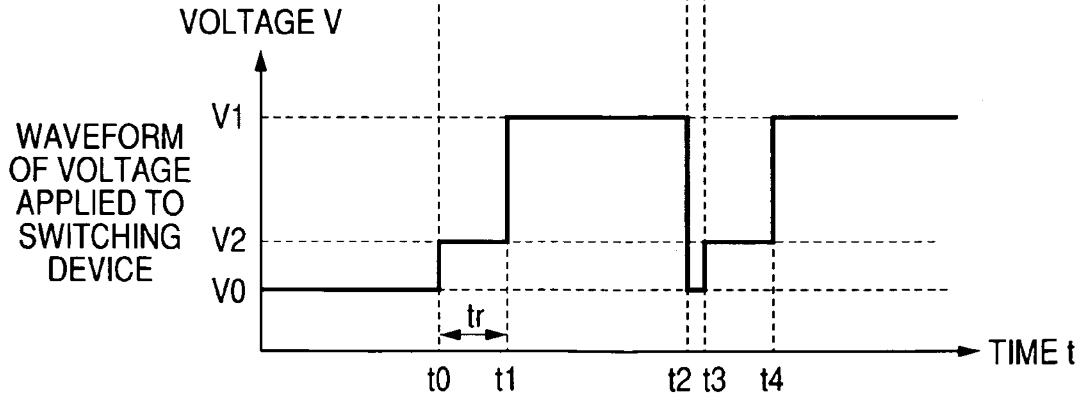
FIG. 3B shows a waveform of voltage applied to switching device.
Figure 4:
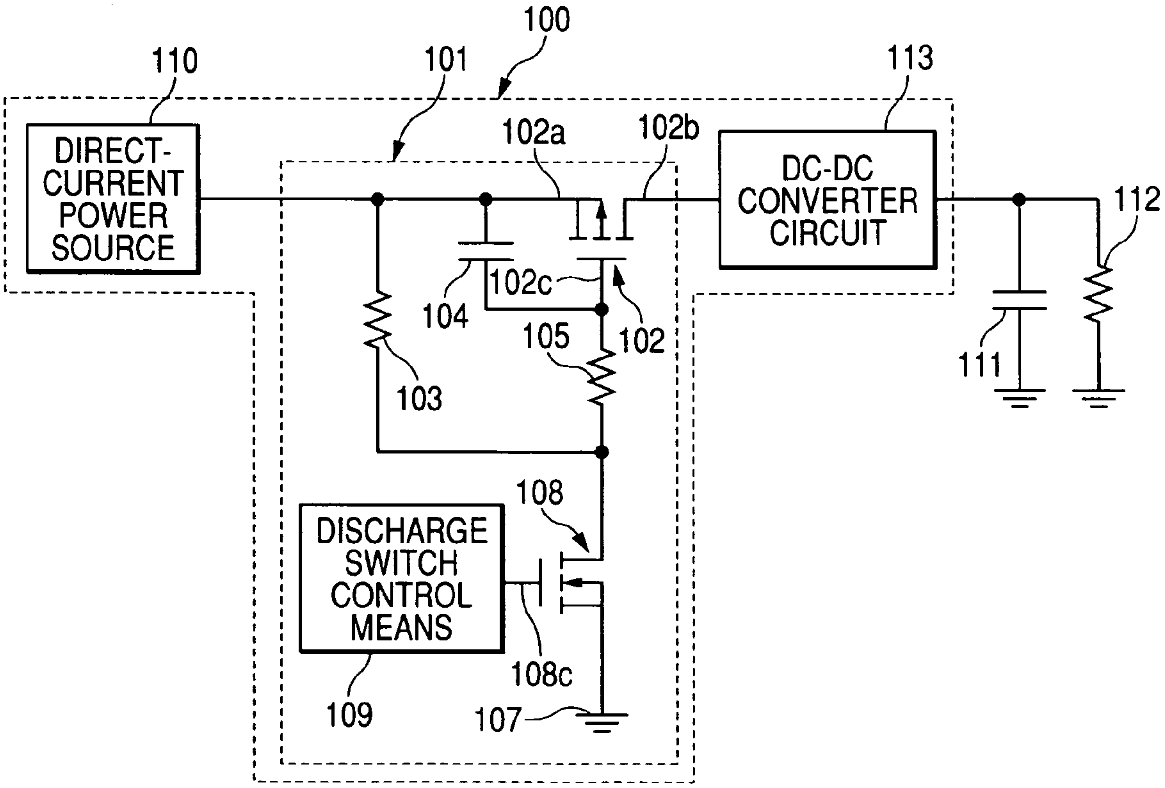
FIG. 4 PRIOR ART
FIG. 4 is a circuit diagram that illustrates a switching power source apparatus and an inrush current preventing circuit thereof according to a prior art.
Figure 5A:
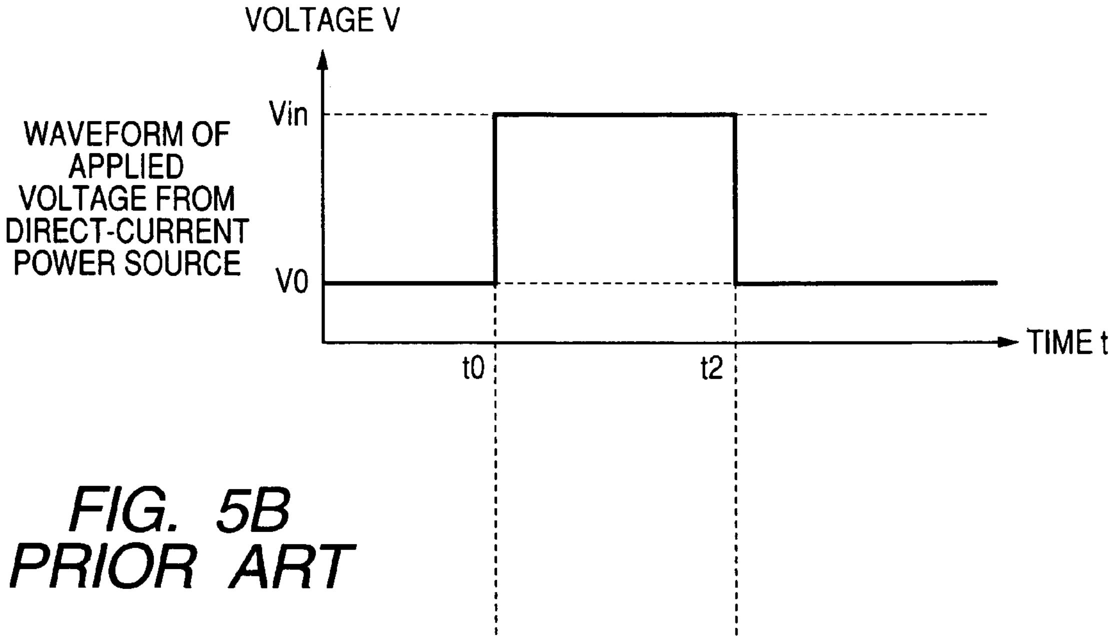
FIG. 5A PRIOR ART
FIG. 5A shows a waveform of applied voltage from direct-current power source.
Figure 5B:
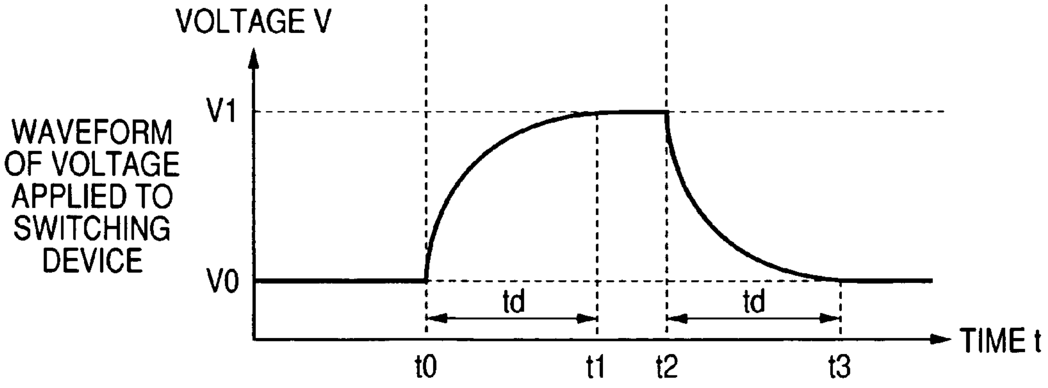
FIG. 5B PRIOR ART
FIG. 5B shows a waveform of voltage applied to switching device.
Figure 6A:
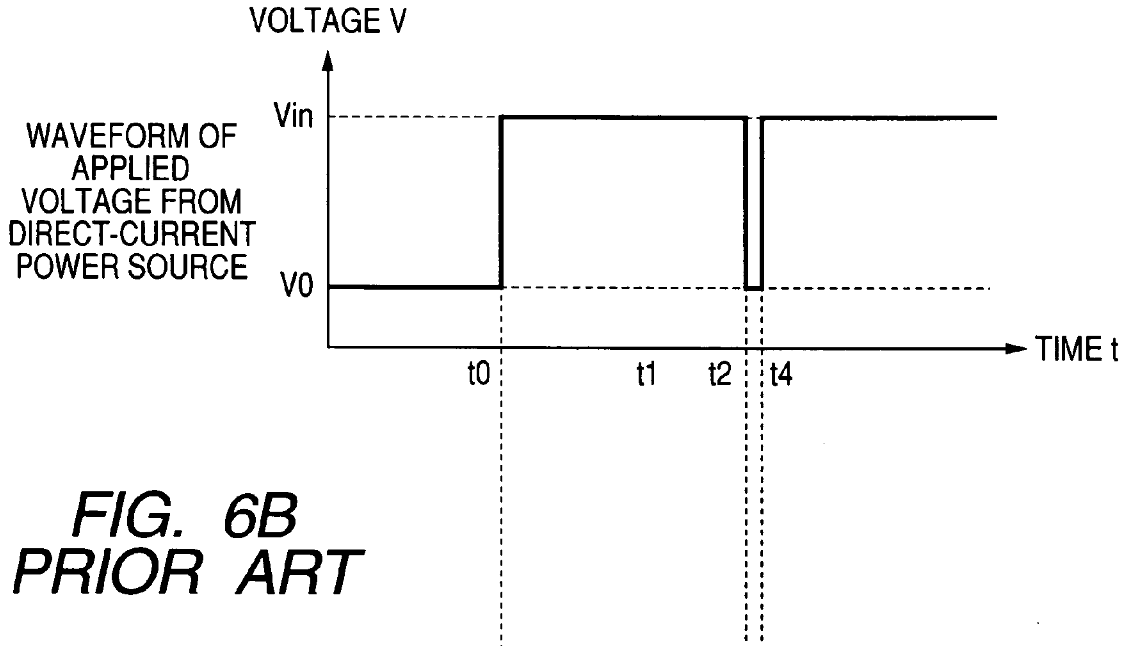
FIG. 6A PRIOR ART
FIG. 6A shows a waveform of applied voltage from direct-current power source.
Figure 6B:
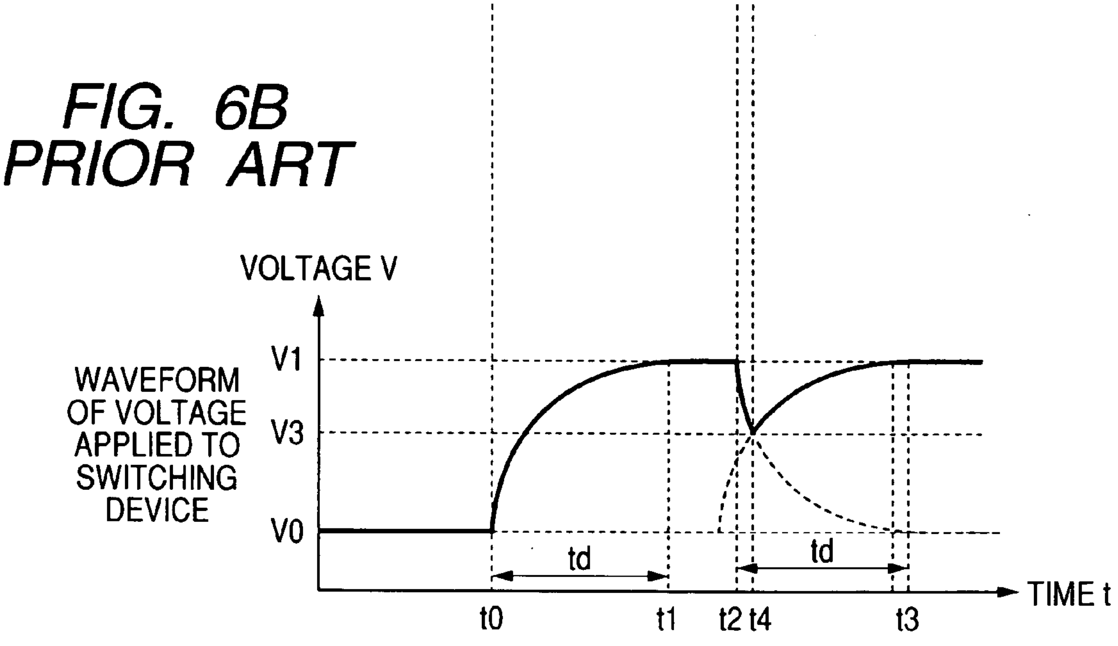
FIG. 6B PRIOR ART
FIG. 6B shows a waveform of voltage applied to switching device.

FIG. 3 shows each voltage applied to an inrush current preventing circuit 1. Specifically, FIG. 3A shows a waveform of applied voltage from direct-current power source 10, and FIG. 3B shows a waveform of voltage applied to switching device 2.

When a direct-current power source 10 starts, since a discharge switch control means 9 transmits a control signal that allows a discharge switching device 8 to be a non-conduction state to the discharge switching device 8, a voltage Vi applied from the direct-current power source 10 is divided by a first resistor 3, a second resistor 5 and a third resistor 6 as the discharge switching device 8 is a non-conduction state. As shown in FIG. 3, a voltage V of a switching device 2 at the time of start t0 becomes a voltage V2 which is lower than a voltage V1 at normal time. When the voltage V of a switching device 2 becomes a voltage V2 which is lower than a voltage V1 at normal time, since current passing the switching device 2 is limited, the inrush current preventing circuit 1 can prevent inrush current which affects a load resistor 12 from flowing to the load resistor 12 from the time when the direct-current power source 10 starts t0 until a predetermined time tr passes.

When the predetermined time tr passes from the time when the direct-current power source 10 starts t0 (hereinafter, referred to as "when a predetermined time passes"), since the discharge switch control means 9 transmits a control signal that allows the discharge switching device 8 to be a conduction state to the discharge switching device 8, the discharge switching device 8 becomes a conduction state and a voltage Vin applied from the direct-current power source 10 is divided by the first resistor 3 and the second resistor 5. For example, the voltage V applied to the switching device 2 can be selectively determined and controlled when the predetermined time tr passes from the time when the direct-current power source 10 starts t0.

As shown in FIG. 3, the voltage V of a switching device 2 when a predetermined time tr passes becomes a value which is equal to a voltage V1 applied at normal time. When the voltage V of the switching device 2 becomes the voltage V1 applied at normal time, since the current passing the switching device 2 can pass without limit, the inrush current preventing circuit 1 can flow a desired current to the load resistor 12 from the time when the predetermined time passes t1 until the direct-current power source 10 stops t2.

When the direct-current power source 10 restarts t3 immediately from the time when the direct-current power source 10 stops t2 (hereinafter, referred to as "when the direct-current power source restarts"), since the discharge switch control means 9, similarly to the time when the direct-current power source starts t0, transmits a control signal allowing the discharge switching device 8 to be a non-conduction state to the discharge switching device 8, a voltage Vin applied from the direct-current power source 10 is divided by the first resistor 3, the second resistor 5, and the third resistor 6.

As shown in FIG. 3, the voltage V of a switching device 2 when the direct-current power source 10 restarts t3 immediately becomes a value that is equal to a voltage V2 when the direct-current power source 10 starts t3. For example, the inrush current preventing circuit is different from the conventional inrush current preventing circuit 101 comprising a condenser 104 as shown in FIG. 4. Since the voltage V of the switching device 2 becomes a voltage V2 which is set in lower value than the voltage V1 at normal time also when the direct-current power source 10 restarts t3 immediately, the inrush current preventing circuit 1 can prevent inrush current which affects a load resistor 12 from flowing to the load resistor 12 without depending on a discharge time of a condenser 104 necessary for a conventional inrush current preventing circuit 101.

Since the discharge switch control means 9 can control a predetermined time tr freely, it can limit current of the switching device 2 during only a predetermined time thinking that inrush current will be generated. When a feedback signal line 14 is disposed from a control means 13 of a electronic equipment to a discharge switch control means 9, the discharge switch control means 9 can control a discharge switching device 8 based on information related to inrush current such as a value of current flowing to an electronic equipment. Since the inrush current preventing circuit 1 is formed as described above, it can prevent passage of an inrush current affecting an electronic equipment also when a direct-current power source 10 starts immediately.

Since the inrush current preventing circuit 1 is formed in a simple construction as a whole, it can achieve save-spacing and improvement of cost performance.

The invention is not limited to the embodiments described above and can be modified variously. For example, a DC-DC converter as shown in FIG. 4 or the like can be connected between an inrush current preventing circuit of the invention and a load-resistor.

The invention claimed is:

1. An inrush current preventing circuit comprising:

a voltage-controlled type switching device that has an input terminal, an output terminal and a control terminal that controls current between the input terminal and the output terminal by an applied voltage;

a first resistor that is connected in parallel between the input terminal and the control terminal;

voltage control means that is connected in series to the control terminal and controls a voltage that is applied to the control terminal;

the voltage control means comprising:

a second resistor that is connected in series to the control terminal;

a third resistor that is connected in series between the second resistor and a ground conductor;

a discharge switching device connected in parallel to the third resistor; and discharge switch control means that transmits a control signal for performing a switching operation of the discharge switching device.

2. The inrush current preventing circuit according to claim 1, wherein the discharge switch control means is configured to transmit a control signal for setting the discharge switching device to a conduction state after a lapse of predetermined time determined by a desired setting.

3. The inrush current preventing circuit according to claim 1, wherein the discharge switch control means is configured to transmit a control signal for setting the discharge switching device to a conduction state based on a predetermined signal transmitted from a control means that controls electronic equipment connected to the output terminal.

* * * * *